Sept. 23, 1947.  E. P. FELCH, JR., ET AL  2,427,666
MAGNETIC FIELD STRENGTH INDICATOR
Filed April 20, 1943

INVENTORS: E. P. FELCH, JR.
T. SLONCZEWSKI
BY
G. H. Heydt
ATTORNEY

Patented Sept. 23, 1947

2,427,666

UNITED STATES PATENT OFFICE 2,427,666

MAGNETIC FIELD STRENGTH INDICATOR

Edwin P. Felch, Jr., Chatham, N. J., and Thaddeus Slonczewski, Glenwood Landing, N. Y., assignors to Bell Telephone Laboratories, Incorporated, New York, N. Y., a corporation of New York Application April 20, 1943, Serial No. 483,754

21 Claims. (Cl. 175—183)

This invention relates to the measurement of magnetic field strength and more particularly is directed to the direct indication of the absolute strength of the magnetic field.

It is a well-known fact that the earth's magnetic field over any given limited area is substantially uniform except that this uniformity may suffer distortion in the presence of paramagnetic or diamagnetic materials. This distortion usually results in a change in both the direction and absolute intensity of the field. In most cases the paramagnetic or diamagnetic body which produces the magnetic distortion is located at a considerable distance from the field strength measuring or indicating device and if the distorting material is to be detected, the measuring or indicating device must be highly sensitive and well compensated against extraneous influences.

It is the object of this invention to provide a measuring and indicating system capable of measuring the absolute field strength of magnetic fields or changes in its strength, independent of extraneous influences or changes in the direction of the magnetic field.

It is a further object of this invention to provide a measuring and indicating system containing no moving parts in its detecting unit which is substantially free of all spurious influences and the measurements of which are independent of the direction taken by the field.

The foregoing objects are achieved by this invention which comprises in combination three magnetometer units each having their principal magnetic axes mutually perpendicular, windings for each of these magnetometers, means for exciting these windings with a voltage of fundamental frequency whereby voltages of second harmonic frequency are induced in each of the magnetometers of magnitudes proportional respectively to the direction cosine of the angle formed by the principal axis of each magnetometer and the direction of the magnetic field, means for squaring each of the second harmonic voltages comprising harmonic generators, circuit means for connecting the outputs of the harmonic generators in parallel and an indicator for indicating the sum of the currents added by the parallel connected circuit means.

Figure 1:
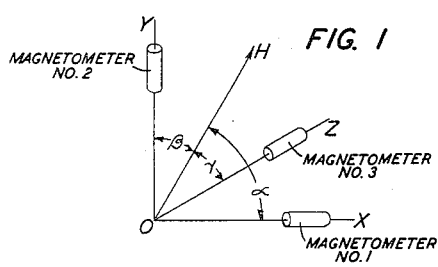
Figure 3:
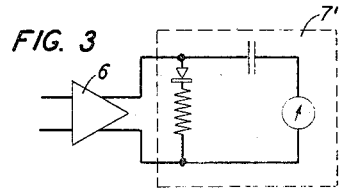
Figure 2:
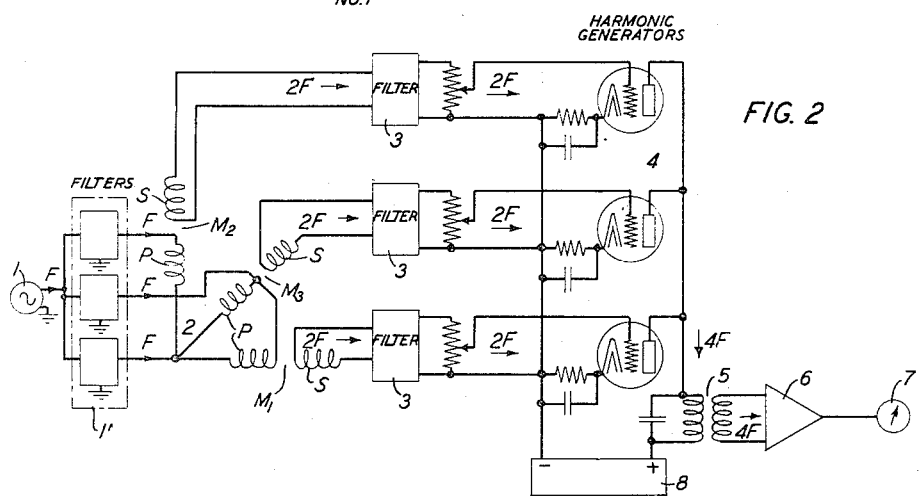
Figure 4:
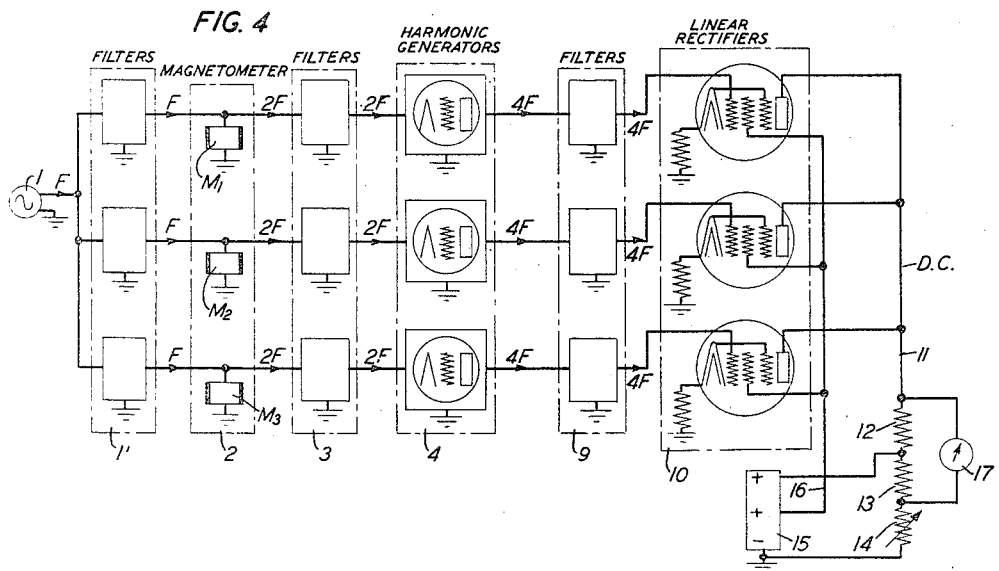

The invention may be better understood by referring to the accompanying drawings in which:

Fig. 1 schematically discloses three magnetometers with their principal axes mutually perpendicular and each forming an angle with the direction of the magnetic field;

Fig. 2 schematically discloses one embodiment of the invention employing second harmonic generators for squaring the magnetometer outputs;

Fig. 3 discloses an alternative form of meter circuit for indicating changes in field strength; and Fig. 4 is another embodiment of the invention employing linear rectifiers connected between the harmonic generators and the meter circuit.

Referring now more particularly to Fig. 1 wherein are shown the three magnetometers with their principal axes mutually disposed perpendicular with each other. These magnetometers are shown for purposes of description with their principal axes corresponding to the three principal axes employed with rectangular Cartesian coordinates and are designated the X, Y and Z axes, respectively. The magnetic field is indicated as a vector H passing through the origin O and forming angles with each of the three coordinate axes. In Fig. 1 the angle formed with the X axis is shown as $\alpha$, the angle formed with the Y axis as $\beta$, and the angle formed with the Z axis as $\gamma$.

These magnetometers comprise essentially a length of low retentivity magnetic material preferably of high permeability and upon which one or more windings are wound. It has been discovered that when the magnetic field is at right angles to the principal axis of the core and the winding be excited by a voltage of fundamental frequency, no even harmonics will be generated in the winding. On the contrary if the magnetic field has a component in the direction of the principal axis of the core and the winding be excited by a voltage of fundamental frequency, even order harmonic voltages will be generated therein. The magnitude of these harmonic voltages will each be proportional to the cosine of the angle formed by the principal axis of the magnetometer and the direction of the magnetic field. While any one of these harmonics can be used, the second harmonic is selected in illustrating this invention.

It can be shown mathematically that the sum of the squares of these three second harmonic voltages is entirely independent of the orientation of the three magnetometers with respect to the direction of the magnetic field, providing the three magnetometers retain their mutually perpendicular relationship and they are equally sensitive. It can also be shown that the square root of the sum of the squares of these second harmonic voltages is proportional to the absolute strength of the magnetic field and likewise independent of the orientation of the magnetometer system with respect to the direction of the magnetic field. It is upon this fundamental principle that this invention is based. Mathematically, the relationships just stated may be expressed as follows:

$$I_1 = K^2 H^2 (\cos^2 \alpha + \cos^2 \beta + \cos^2 \gamma) = K_1 H^2 \quad (1)$$

where $I_1$ = the sum of the three squared magnetometer currents.

$K_1 = K^2$ = proportionality constant. ($K$ must be effectively the same for all three magnetometers.)

$H$ = absolute magnitude of the magnetic field vector.

Equation 1 above expresses the fundamental fact that for the magnetometer structure described above the sum of the three squared magnetometer currents will be equal to the products of the proportionality constant $K_1$ and the absolute magnitude of the magnetic field strength $H$. It is obvious, of course, that the indicating instrument which responds to the current $I_1$ may either be calibrated to indicate the square root of this current or, in the alternative, may have its response characteristic so modified as to indicate the square root of this current on a linear scale. In either case the indication I would be directly proportional to the absolute magnitude of the field strength vector $H$. With the indicating instrument or scale so modified the following expression will obtain:

$$I = \sqrt{I_1} = KH \quad (2)$$

It is evident that the scale of this instrument may have inscribed directly thereon the magnetic field strength in suitable units.

The three magnetometers shown in Fig. 1 may be mounted by any suitable means so that their principal axes are mutually perpendicular. A more complete description of one suitable mounting means is more particularly described in the copending application of T. Slonczewski, Serial No. 483,756, filed on even date herewith.

In Fig. 2 the three magnetometers are denoted $M_1$, $M_2$ and $M_3$ for the X, Y and Z axis respectively. Each of these magnetometers are shown as comprising a primary winding P and secondary winding S. The three magnetometers are designated as a complete subassembly by the reference numeral 2. It will be noted that the three primary windings are connected in parallel to a sine wave source of alternating current I through a fundamental frequency filter bank 1'. Filter bank 1' is adapted to pass the fundamental frequency and reject voltages of second harmonic frequency. These filters prevent the voltages of second harmonic frequency of one magnetometer channel from being transmitted through another magnetometer channel. Each of the secondary windings S, S, S, is connected to an individual filter unit 3 adapted to transmit voltages of second harmonic frequency from their respective magnetometer secondaries and reject all other frequencies. The outputs of these filter units are connected through potentiometers to the grid circuits of three second harmonic producing tubes denoted generally by the reference numeral 4. The potentiometers connected in the input circuits of the three harmonic generators 4 provide an easy means for effectively equalizing the sensitivities of the three magnetometers to make the constant K in Equation 1 the same for all three channels. The detail circuits for the second harmonic producing tubes are not shown as such circuits are well known to the art. The outputs of these three second harmonic producing tubes are connected in parallel by connecting the plates together and the cathode circuits together, and to a source of direct current 8 through the primary of a tuned circuit 5.

Tuned circuit 5 comprises a two-winding transformer with the primary tuned to a frequency equal to the fourth harmonic of the alternating current voltage source I. The output of this tuned network 5 is fed through an amplifier 6 for amplification and applied to an indicating instrument 7.

The operation of this circuit may be described as follows: It is assumed that the three magnetometers $M_1$, $M_2$ and $M_3$ are mutually perpendicular one with the other and that they are immersed in a magnetic flield to be measured which may take any direction with respect to the principal axes of the three magnetometers. It is to be remembered that the individual second harmonic voltages generated in the three secondaries will be proportional to the product of the strength of the magnetic field and the direction cosine of the angle formed by the principal axis of each magnetometer with the direction of this field. These second harmonic voltages are passed by their individual filters 3 to the grid circuit of their associated second harmonic producing tubes. Each of these tubes actually produce a number of harmonics of the voltage applied to their grid circuits. Among these harmonics is the second harmonic which is known to predominate and to have a magnitude proportional to the square of the magnitude of the input voltage. For a more detailed description of the theory of such circuits, reference may be made to the first edition of "The Thermionic Vacuum Tube and its Application" by H. J. Van der Bijl, page 168.

To avoid confusion in terminology the second harmonics produced by the second harmonic producing tubes 4 will be hereinafter referred to as the fourth harmonics because the output frequency of these tubes is equal to the fourth harmonic of the frequency produced by alternating current source I. Therefore, unless specifically stated to the contrary whenever reference is made to the fundamental frequency it is the frequency of alternating current source I which is referred to, voltages of second harmonic frequency refer to voltages produced in the secondary windings S of the magnetometers which are applied to the grid circuits of the second harmonic producing tubes 4 and the second harmonics produced by the second harmonic producing tubes will be referred to as the fourth harmonics.

As just stated the amplitude of the fourth harmonic currents coming from each of the generators 4 is proportional to the square of the amplitudes of the second harmonic voltages coming from the magnetometer secondaries and applied to the grids of each of these tubes. These fourth harmonic currents are added together by means of the parallel plate circuit connections and are all passed through the primary windings of the transformer network. Since the primary winding of this network 5 is tuned to the fourth harmonic, a voltage proportional to the sum of the fourth harmonic currents will be applied to the input circuit of amplifier 6. After amplification this fourth harmonic voltage is applied to meter 7.

Meter 7 may be calibrated to indicate directly the absolute strength of the magnetic field necessary to produce the fourth harmonic currents which in turn produce the meter deflection. It is to be remembered that the sum of these three fourth harmonic currents is proportional to the sum of the squares of the three individual second harmonic currents produced in the three magnetometers and that these in turn are proportional to the square of the absolute strength of the magnetic field. Hence, if meter 7 is calibrated to read the square root of the current passing therethrough it will necessarily indicate the absolute magnitude of the magnetic field in which the three magnetometers are immersed as expressed by Equation 2 above.

If instead of indicating directly the absolute magnitude of the magnetic field it is desired to indicate changes in the strength of the magnetic field, a meter circuit of the type shown in Fig. 3 may be employed. In this figure, meter 7 is replaced by the meter circuit 7' comprising a half wave rectifier, resistor, condenser and direct current indicator connected as shown schematically. It will be apparent to those skilled in the art that so long as the output voltage of amplifier 6 remains unchanged the charge on the condenser in the meter circuit will also remain unchanged and hence the direct current indicator in series therewith will show a zero deflection. However, should this voltage vary in magnitude in either direction there will be an increase or decrease in the charge on the condenser and consequently a current through the direct current indicator corresponding to this change in charge. This type of meter circuit therefore automatically maintains a zero indication for zero change in absolute field strength. The deflection of this instrument will be in one direction from zero for an increase in absolute strength of the magnetic field and in the opposite direction from zero for a decrease in absolute strength of the magnetic field.

In order for the circuit arrangement of Fig. 2 to be successfully practiced, it is necessary that the phase relationship of the three second harmonic voltages from the magnetometer secondaries be so adjusted that they are always substantially in phase when applied to their respective second harmonic generator input circuits. It is obvious that if these three voltages are displaced in phase with respect to one another their corresponding fourth harmonic currents in the output circuits of the harmonic generators would be added vectorially rather than algebraically, but on the other hand if they are in phase then these fourth harmonic currents are added algebraically. This is accomplished by preliminary adjustments for phase shift in the construction of the three filters. However, the necessity for such adjustments may be entirely eliminated by utilizing the circuit arrangement shown in Fig. 4.

The arrangement shown in Fig. 4 differs from that in Fig. 2 in that before adding the fourth harmonic currents they are first rectified and added on a direct current basis. This obviates the phase difficulty mentioned above.

The magnetometers $M_1$, $M_2$ and $M_3$ shown in Fig. 2 were schematically disclosed as having two coils, a primary and a secondary. It is obvious to those skilled in the art that the second harmonic voltages are induced not only in the secondary winding but also in the primary winding and that therefore the secondary winding may be dispensed with. In Fig. 4 the magnetometers $M_1$, $M_2$ and $M_3$ are shown schematically as having a single winding. The voltage of fundamental frequency F from alternating current source 1 is applied to each of these magnetometer windings through an individual filter in filter bank 1', the return to the alternating current source being made by way of ground. The function of filter bank 1' is the same as described for filter bank 1' in Fig. 2.

The second harmonic outputs from the magnetometers are transmitted through second harmonic filters 3 and applied to the grid circuits of the harmonic generators 4. Here the previously described squaring action takes place and the fourth harmonic output is passed through a fourth harmonic filter bank 9 to a bank of linear rectifiers 10. The outputs of these three linear rectifiers are added together by connecting their plates in parallel through a conductor 11.

The cathode resistors of these linear rectifiers are relatively large so that the plate current drops therein produce bias voltages on their respective control grids near the cut-off point. The suppressor grids are connected within the tubes to the cathodes while the screen grids are supplied with a direct current positive bias from direct current source 15 via conductor 16. The plate current is also supplied from source 15 through resistor 12 and conductor 11. Linear rectifiers of this type are well known in the art and require no further detailed description.

Direct current meter 17 is connected in the anode circuit of these linear rectifiers and is responsive to the direct current output. In order to adjust meter 17 to read zero for a predetermined direct current output of these linear rectifiers, a network comprising resistors 13 and 14 are connected to the meter circuit and voltage source 15. By proper adjustment of the magnitude of resistor 14 the opposition voltage drop produced across resistor 13 will just compensate the plate current drop in resistor 12.

The operation of the circuit disclosed in Fig. 4 is as follows: Magnetometers $M_1$, $M_2$ and $M_3$ are immersed in a magnetic field to be measured. Each of these magnetometers is energized from a source of fundamental frequency 1 through its filter unit 1'. The respective second harmonics are taken from these magnetometers and passed through their second harmonic filters to the input circuits of the harmonic generators 4. Filters 3 prevent the impression of any voltage of frequencies different from the second harmonics on the input circuits of the harmonic generators. The harmonic generators produce the second harmonics of their respective input voltages. These second harmonics are the fourth harmonics of the fundamental frequency of source 1 and are passed through their respective filters 9 to the input circuits of the linear rectifiers 10. It should be remembered that the voltage of each of these fourth harmonic frequencies is proportional to the square of the output second harmonic voltage coming from the associated magnetometer. The rectified output currents from the linear rectifiers are each respectively proportional, therefore, to the square of the second harmonic output from its associated magnetometer and hence when added in circuit 11 they will produce a total current proportional to the sum of the squares of the second harmonic voltages. If the field in which the magnetometers are immersed is the reference field then rheostat 14 may be adjusted until a zero indication on meter 17 is obtained. Now if the magnetometers are moved to another location where the absolute magnitude of the field is different or if the field strength is otherwise varied, indicator 17 will show the change in absolute strength of the field, that is, the difference between the strength of the new field and that of the reference field.

It is obvious that any one of the other even order harmonics generated in the magnetometers may be used instead of the second harmonic, although the second harmonic is preferred because it is ordinarily more easily filtered than the higher order harmonics.

What is claimed is:

1. A system for indicating the field strength of magnetism comprising in combination three magnetometer cores of magnetic material having their principal magnetic axes mutually perpendicular, windings for each core, a source of alternating current coupled to said windings whereby second harmonic voltages are induced therein of magnitudes proportional respectively to the product of the field strength and the direction cosine of the angle formed between the principal axis of each core and the direction of the magnetic field, an electric squaring means responsive to the three second harmonic voltages, said squaring means comprising three harmonic generators, one coupled to each magnetometer, an output circuit for each generator, an electric circuit connecting in parallel the output circuits of the three harmonic generators, a filter included in said output circuits capable of passing only current equal to the fourth harmonic of said alternating current whereby the three fourth harmonic output currents from the harmonic generators are effectively added together, and an indicator responsive to the sum of the added currents.

2. A system for indicating the field strength of magnetism comprising in combination three magnetometer cores of magnetic material having their principal magnetic axes mutually perpendicular, windings for each core, a source of alternating current coupled to said windings whereby second harmonic voltages are induced therein of magnitudes proportional respectively to the product of the field strength and the direction cosine of the angle formed between the principal axis of each core and the direction of the magnetic field, a separate filter for each magnetometer interposed between the magnetometer and said source and capable of passing only current of fundamental frequency, an electric squaring means responsive to the three second harmonic voltages, said squaring means comprising three harmonic generators one coupled to each magetometer, an output circuit for each generator, an electric circuit connecting in parallel the output circuits of the three harmonic generators, a filter included in said output circuits capable of passing only current equal to the fourth harmonic of said alternating current whereby the three fourth harmonic output currents from the harmonic generators are effectively added together, and an indicator responsive to the sum of the added currents.

3. A system for indicating the field strength of magnetism comprising in combination three magnetometer cores of magnetic material having their principal magnetic axes mutually perpendicular, windings for each core, a source of alternating current coupled to said windings whereby second harmonic voltages are induced therein of magnitudes proportional respectively to the product of the field strength and the direction cosine of the angle formed between the principal axis of each core and the direction of the magnetic field, an electric squaring means responsive to the three second harmonic voltages, said squaring means comprising three harmonic generators one coupled to each magnetometer, a filter interposed between each magnetometer and its associated harmonic generator capable of passing only the voltages of second harmonic frequency, an output circuit for each generator, an electric circuit connecting in parallel the output circuits of the three harmonic generators, a filter included in said output circuits capable of passing only currents equal to the fourth harmonic of said alternating current whereby the three fourth harmonic output currents from the harmonic generators are effectively added together, and an indicator responsive to the sum of the added currents.

4. A system for indicating the field strength of magnetism comprising in combination three magnetometer cores of magnetic material having their principal magnetic axes mutually perpendicular, windings for each core, a source of alternating current coupled to said windings whereby second harmonic voltages are induced therein of magnitudes proportional respectively to the product of the field strength and the direction cosine of the angle formed between the principal axis of each core and the direction of the magnetic field, a separate filter for each magnetometer interposed between the magnetometer and said source and capable of passing only current of fundamental frequency, an electric squaring means responsive to the three second harmonic voltages, said squaring means comprising three harmonic generators, one coupled to each magnetometer, a filter interposed between each magnetometer and its associated harmonic generator capable of passing only the voltages of second harmonic frequency, an output circuit for each generator, an electric circuit connecting in parallel the output circuits of the three harmonic generators, a filter included in said output circuits capable of passing only current equal to the fourth harmonic of said alternating current source whereby the three fourth harmonic output currents from the harmonic generators are effectively added together, and an indicator responsive to the sum of the added currents.

5. The combination according to claim 1 wherein the indicator comprises a rectifier connected in parallel with a circuit including a capacitor connected in series with a direct current meter whereby the meter responds to variations in the sum of the added currents.

6. The combination according to claim 2 wherein the indicator comprises a rectifier connected in parallel with a circuit including a capacitor connected in series with a direct current meter whereby the meter responds to variations in the magnitude of the added current.

7. The combination according to claim 3 wherein the indicator comprises a rectifier connected in parallel with a circuit including a capacitor connected in series with a direct current meter whereby the meter responds to variations in the magnitude of the added current.

8. The combination according to claim 4 wherein the indicator comprises a rectifier connected in parallel with a circuit including a capacitor connected in series with a direct current meter, whereby the meter responds to variations in the magnitude of the added current.

9. The combination according to claim 1 wherein the filter included in the harmonic generator output circuits comprises a tuned transformer.

10. The combination according to claim 2 wherein the filter included in the harmonic generator output circuits comprises a tuned transformer.

11. The combination according to claim 3 wherein the filter included in the harmonic generator output circuits comprises a tuned transformer.

12. The combination according to claim 4 wherein the filter included in the harmonic generator output circuits comprises a tuned transformer.

13. The combination according to claim 1 wherein the filter included in the harmonic generator output circuits comprises a separate filter network connected to the individual output circuit of each harmonic generator.

14. The combination according to claim 2 wherein the filter included in the harmonic generator output circuits comprises a separate filter network connected to the individual output circuit of each harmonic generator.

15. The combination according to claim 3 wherein the filter included in the harmonic generator output circuits comprises a separate filter network connected to the individual output circuit of each harmonic generator.

16. The combination according to claim 4 wherein the filter included in the harmonic generator output circuits comprises a separate filter network connected to the individual output circuit of each harmonic generator.

17. A system for indicating the field strength of magnetism comprising in combination three magnetometer cores of magnetic material having their principal magnetic axes mutually perpendicular, windings for each core, a source of alternating current coupled to said windings whereby second harmonic voltages are induced therein of magnitudes proportional respectively to the product of the field strength and the direction cosine of the angle formed between the principal axis of each core and the direction of the magnetic field, an electric squaring means responsive to the three second harmonic voltages, said squaring means comprising three harmonic generators, one coupled to each magnetometer, an output circuit for each generator, a separate filter network connected to each of the harmonic generator output circuits, said filter capable of passing only currents of frequency equal to the fourth harmonic of said alternating current source, a separate linear rectifier connected to the separate filter in the output circuit of each generator for converting to direct current the fourth harmonic current passing through each of the three filters, an output circuit for each rectifier, a circuit connecting the rectifier output circuits in parallel whereby the total rectified current is proportional to the sum of the three fourth harmonic currents, and a direct current indicator responsive to the total rectified current.

18. A system for indicating the field strength of magnetism comprising in combination three magnetometer cores of magnetic material having their principal magnetic axes mutually perpendicular, windings for each core, a source of alternating current coupled to said winding whereby second harmonic voltages are induced therein of magnitudes proportional respectively to the product of the field strength and the direction cosine of the angle formed between the principal axis of each core and the direction of the magnetic field, a separate filter for each magnetometer interposed between the magnetometers and said source and capable of passing only current of fundamental frequency, an electric squaring means responsive to the three second harmonic voltages, said squaring means comprising three harmonic generators one coupled to each magnetometer, an output circuit for each generator, a separate filter network connected to each of the harmonic generator output circuits, said filter capable of passing only current of frequency equal to the fourth harmonic of said alternating current source, a separate linear rectifier connected to the separate filter in the output circuit of each generator for converting to direct current the fourth harmonic current passing through each of the three filters, an output circuit for each rectifier, a circuit connecting the rectifier output circuits in parallel whereby the total rectified current is proportional to the sum of the three fourth harmonic currents, and a direct current indicator responsive to the total rectified current.

19. A system for indicating the field strength of magnetism comprising in combination three magnetometer cores of magnetic material having their principal magnetic axes mutually perpendicular, windings for each core, a source of alternating current coupled to said windings whereby second harmonic voltages are induced therein of magnitudes proportional respectively to the product of the field strength and the direction cosine of the angle formed between the principal axis of each core and the direction of the magnetic field, an electric squaring means responsive to the three second harmonic voltages, said squaring means comprising three harmonic generators one coupled to each magnetometer, a filter interposed between each magnetometer and its associated harmonic generator capable of passing only the voltages of second harmonic frequency, an output circuit for each generator, a separate filter network connected to each of the harmonic generator output circuits, said filter capable of passing only currents of frequency equal to the fourth harmonic of said alternating current source, a separate linear rectifier connected to the separate filter in the output circuit of each generator for converting to direct current the fourth harmonic current passing through each of the three filters, an output circuit for each rectifier, a circuit connecting the rectifier output circuits in parallel whereby the total rectified current is proportional to the sum of the three fourth harmonic currents and a direct current indicator responsive to the total rectified current.

20. A system for indicating the field strength of magnetism comprising in combination three magnetometer cores of magnetic material having their principal magnetic axes mutually perpendicular, windings for each core, a source of alternating current coupled to said windings whereby second harmonic voltages are induced therein of magnitudes proportional respectively to the product of the field strength and the direction cosine of the angle formed between the principal axis of each core and the direction of the magnetic field, a separate filter for each magnetometer interposed between the magnetometers and said source capable of passing only currents of fundamental frequency, an electric squaring means responsive to the three second harmonic voltages, said squaring means comprising three harmonic generators one coupled to each magnetometer, a filter interposed between each magnetometer and its associated harmonic generator capable of passing only the voltages of second harmonic frequency, an output circuit for each generator, a separate filter network connected to each of the harmonic generator output circuits, said filter capable of passing only currents of frequency equal to the fourth harmonic of said alternating current source, a separate linear rectifier connected to the separate filter in the output circuit of each generator for converting to direct current the fourth harmonic current passing through each of the three filters, an output circuit for each rectifier, a circuit connecting the rectifier output circuits in parallel whereby the total rectified current is proportional to the sum of the three fourth harmonic currents, and a direct current indicator responsive to the total rectified current.

21. A system for indicating the field strength of magnetism comprising in combination three magnetometer cores of magnetic material having their principal magnetic axes mutually perpendicular, windings for each core, a source of alternating current coupled to said windings whereby even order harmonic voltages are induced therein of magnitudes proportional respectively to the product of the field strength and the direction cosine of the angle formed between the principal axis of each core and the direction of the magnetic field, an electric squaring means responsive to three of the even order harmonic voltages one selected from each of the three magnetometers, said squaring means comprising three harmonic generators one coupled to each magnetometer, an output circuit for each generator, an electric circuit connecting in parallel the output circuits of the three harmonic generators, a filter included in said output circuit capable of passing only currents of frequency equal to twice the selected even order harmonic of said alternating current whereby the three selected and squared harmonic output currents from the harmonic generators are effectively added together, and an indicator responsive to the sum of the added currents.

EDWIN P. FELCH, Jr.
THADDEUS SLONCZEWSKI.